(12) United States Patent
An

(10) Patent No.: US 7,133,621 B1
(45) Date of Patent: Nov. 7, 2006

(54) OPTICAL COMMUNICATION WITH PHASE ENCODING AND PHASE SHIFTING

(75) Inventor: Fu-Tai An, Stanford, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 696 days.

(21) Appl. No.: 10/194,795

(22) Filed: Jul. 12, 2002

(51) Int. Cl.
*H04B 10/04* (2006.01)

(52) U.S. Cl. ............ 398/185; 398/183; 398/188; 398/187

(58) Field of Classification Search ........ 398/183, 398/185, 188, 194, 186, 198, 192, 201
See application file for complete search history.

(56) References Cited

U.S. PATENT DOCUMENTS

| | | | |
|---|---|---|---|
| 3,108,261 A | | 10/1963 | Miller |
| 4,623,886 A | * | 11/1986 | Livingston ............ 340/825.5 |
| 5,227,908 A | * | 7/1993 | Henmi .................... 398/192 |
| 5,301,058 A | * | 4/1994 | Olshansky .............. 398/194 |
| 5,513,029 A | * | 4/1996 | Roberts .................... 398/32 |
| 5,999,300 A | * | 12/1999 | Davies et al. ............ 398/185 |
| 6,005,702 A | * | 12/1999 | Suzuki et al. ............ 398/185 |

OTHER PUBLICATIONS

Smith, Graham; Novak, Dalma; Ahmed, Zaheer, "Overcoming Chromatic-Dispersion Effects in Fiber-Wireless Systems Incorporating External Modulators," IEEE transactions on Microwave Theory and techniques, vol. 45, No. 8, Aug. 1997.

Narasimh, A.; Meng, X.J.; Wu, M.C.; and Yablonovitch, E., "Tandem Single Sideband Modulation Scheme for Doubling Spectral Efficiency of Analogue Fibre Links," IEEE Electronics Letters Jun. 22, 2000, vol. 36, No. 13, pp. 1135-1136.

Hui, R; Zhu, B.; Huang, R.; Allen, C.; Demarest, K. and Richards, D., "10 Gb/s SCM System Using Optical Single Side-band Modulation," MM4-1 The Information and Telecomunication technology Center, Department of Electrical and Computer Science, the University of Kansas, Lawrence, KS 66044.

Frankel, Michael Y.; Esman, Ronald D., "Optical Single-Sideband Suppressed-Carrier Modulator for Wide-Band Signal Processing," Journal of Lightwave Technology, vol. 16, No. 5, May 1998, pp. 859-863.

* cited by examiner

Primary Examiner—David C. Payne

(57) ABSTRACT

A communication system comprises a phase encoder, a phase shifter, and a modulator. The phase encoder receives user data and phase encodes the user data to form an encoded signal representing the user data. The phase shifter shifts a phase of the encoded signal to generate a phase shifted signal. The modulator receives a first optical signal and modulates the first optical signal with the encoded signal and the phase shifted signal to form an optical single sideband signal representing the user data. The modulator then transmits the optical single sideband signal representing the user data.

30 Claims, 9 Drawing Sheets

OPTICAL COMMUNICATION WITH PHASE ENCODING AND PHASE SHIFTING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to communication systems and methods with phase encoding and phase shifting.

2. Description of the Prior Art

Communication systems use optical signals to communicate over optic fiber. Some of these systems transmit optical signals with a carrier frequency and sidebands. These sidebands carry the user data and are at frequencies slightly above and below the carrier frequency. In Optical Single Sideband (OSSB) transmission, one of the sidebands is almost completely removed.

One prior system for OSSB transmission uses electrical sub-carrier techniques. This system uses an electrical hybrid with a Dual-Electrode Mach-Zehnder modulator to generate OSSB signals. This prior system is essentially a replicate of the Hilbert architecture widely used in the RF domain. Because the electrical hybrid is a narrowband device, some prior systems first modulate the data onto a microwave sub-carrier and then pass the sub-carrier through the electrical hybrid. Although results of these systems show good sideband suppression, the non-linear transfer curve of the Dual-Electrode Mach-Zehnder modulator limits the modulation index and sub-carrier's frequency selection, especially when multiple sub-carriers are present. Another problem is the guardbands among microwave sub-channels impose limitations on the spectral efficiency. One of these systems also suppresses the carrier with a optical circulator and a Fabry-Perot filter. Suppression of the carrier is desirable because the carrier contains no useful information and occupies a large portion of the transmission power. Previous research into combining OSSB with carrier suppression is very limited due to previous complex architectures.

Prior electrical systems have used various encoding techniques for better binary signal performance. The simplest technique is non-return to zero (NRZ), where a binary 1 is represented by optical power within a bit period and a binary 0 is represented by zero optical power. Another technique is return to zero (RZ), where a binary 1 is an optical pulse while binary 0 means no optical power. Other types of encoding use phase transition of the signal to indicate a 1 or a 0, which is called phase encoding. One example of phase encoding is Manchester encoding. In Manchester encoding, a logical 0 is by a transition at the edge of a bit period, while a logical 0 is represented by a transition at the bit center. One problem with Manchester coding optical signals is the signal spectrum is doubled as compared with NRZ line coding.

Another example of phase encoding is Miller encoding, which is also called delay modulation. In Miller encoding, a logical 1 is represented with a phase transition at the bit center. A logical 0 is represented with no phase transition at the bit center. Two consecutive logical 0 has a phase transition at the boundary of the end of the first bit. Miller coding concentrates signal's power spectral density such that the signal's spectral occupancy is narrow. Miller coding has not been used in externally-modulated optical communication systems.

SUMMARY OF THE INVENTION

The inventions solve the above problems by phase encoding and phase shifting. A communication system comprises a phase encoder, a phase shifter, and a modulator. The phase encoder receives user data and phase encodes the user data to form an encoded signal representing the user data. The phase shifter shifts a phase of the encoded signal to generate a phase shifted signal. The modulator receives a first optical signal and modulates the first optical signal with the encoded signal and the phase shifted signal to form an optical single sideband signal representing the user data. The modulator then transmits the optical single sideband signal representing the user data.

In some embodiments, the phase encoder Miller encodes the user data to form the encoded signal representing the user data. In other embodiments, the phase encoder Manchester encodes the user data to form the encoded signal representing the user data. In some embodiments, the phase shifter shifts the phase of the encoded signal by ninety degrees. In some embodiments, the communication system includes an optical filter that suppresses a carrier of the optical single sideband signal. In some embodiments, the modulator comprises a Dual-Electrode Mach-Zehnder modulator configured to modulate the first optical signal with the encoded signal and the phase shifted signal.

In some embodiments, the communication system advantageously has superior sideband suppression ratio using Miller coding. Another advantage in some embodiments is spectral efficiency of greater than 1 bps/Hz can be achieved by the communication system because of the narrow transmission bandwidth. Another advantage in some embodiments is no additional active analog circuitry is required except for the Dual-Electrode Mach-Zehnder modulator.

BRIEF DESCRIPTION OF THE DRAWINGS

The same reference number represents the same element on all drawings.

DETAILED DESCRIPTION OF THE INVENTION

FIGS. 1–7D and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
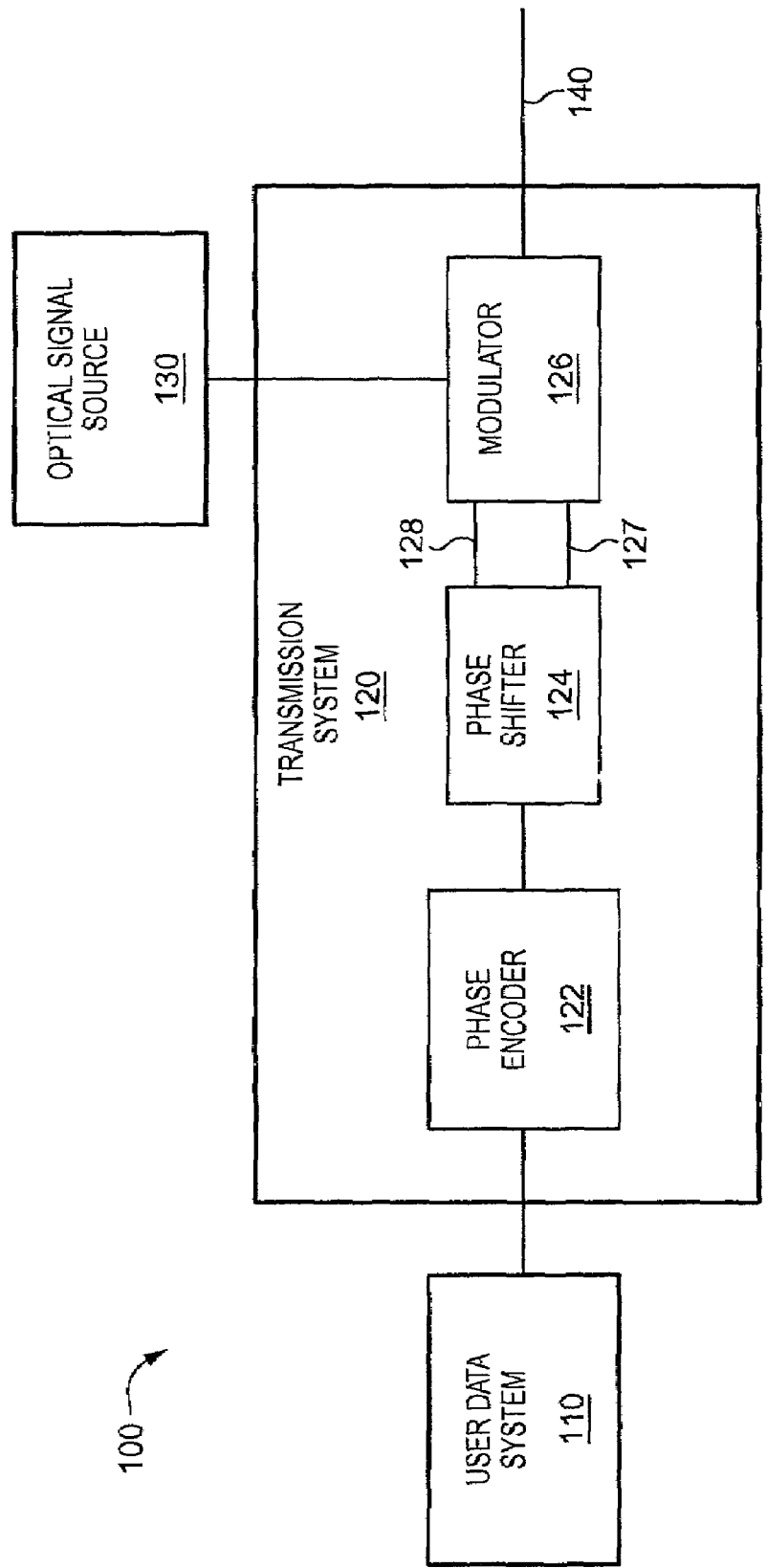
FIG. 1 is a block diagram of a communication system in an example of the invention.
Figure 2:
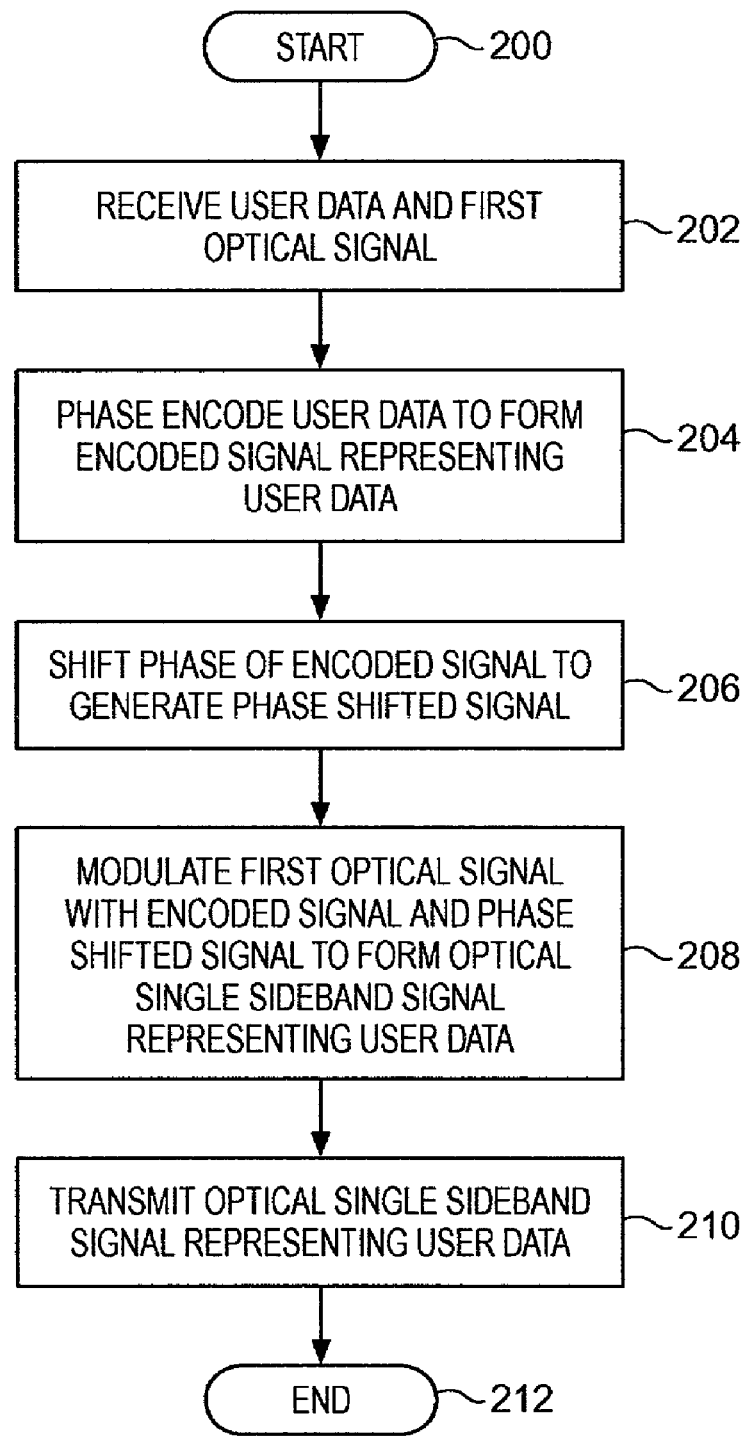
FIG. 2 is a flow chart of a transmission system in an example of the invention.

Communication System—FIGS. 1–2

FIG. 1 depicts a block diagram of a communication system 100 in an example of the invention. The communication system 100 includes a user data system 110, a transmission system 120, and an optical signal source 130. The transmission system 120 includes a phase encoder 122, a phase shifter 124, and a modulator 126. The user data system 110 is connected to the phase encoder 122. The phase encoder 122 is connected to the phase shifter 124. The phase shifter 124 is connected to the modulator 126 via a link 127 and a link 128. The modulator 126 is connected to the optical signal source 130. The modulator 126 is connected to an optic fiber 140. In some embodiments, the user data system 110 and the optical signal source 130 are within the transmission system 120. The link 127 and the link 128 are for the non-phase shifted signal and phase shifted signal respectively. In other embodiments, the link 127 is connected directly to the phase encoder 122 and bypasses the phase shifter 124 because the corresponding non-phase signal is not phase shifted.

The user data system 110 is any device, group of devices, or system configured to transmit user data. User data is any data or information that users communicate with over a communication network. The transmission system 120 is any device, group of devices, or system configured to (1) receive user data and a first optical signal, (2) phase encode the user data to form an encoded signal representing the user data, (3) shift a phase of the encoded signal to generate a phase shifted signal, (4) modulate the first optical signal with the encoded signal and the phase shifted signal to form an optical single sideband signal representing the user data, and (5) transmit the optical single sideband signal representing the user data.

Phase encoding is a method of changing the form of data or information into signals such that the phases of the signals indicates a binary representation of the data or information. Some examples of phase encoding are Manchester and Miller coding. In Miller coding, a logical 1 is represented with a phase transition at the bit center, a logical 0 is represented with no phase transition at the bit center, and two consecutive logical 0 has a phase transition at the boundary of the end of the first bit. Miller encoding is also called delay modulation. Phase shifting is a method of shifting a phase of the signal. In some embodiments, an electrical hybrid shifts the phase of the signal. In some embodiments, the phase of the signal is shifted 90 degrees to form a Hilbert transform of the signal. A Hilbert transform is a mathematical transform that shifts the phase of a signal by 90 degrees. An encoded signal is any signal that is phase encoded. An optical single sideband signal is any optical signal where the signal comprises one sideband that carries data or information.

The phase encoder 122 is any device or system configured to receive user data and phase encode the user data to form an encoded signal representing the user data. One example of the phase encoder 122 is the Miller encoder described below. The phase shifter 124 is any device or system configured to shift a phase of the encoded signal to generate a phase shifted signal. One example of the phase shifter is the electrical hybrid described below. The modulator 126 is any device or system configured to receive the first optical signal and modulate the first optical signal with the encoded signal and the phase shifted signal to form an optical single sideband signal representing the user data. One example of the modulator 126 is the Dual-Electrode Mach-Zehnder modulator described below. The optical signal source 130 is any device or system configured to generate and transmit optical signals. One example of the optical signal source 130 is a tunable laser source. In another example, the optical signal source 130 is any laser source.

FIG. 2 depicts a flow chart of the transmission system 120 in an example of the invention. FIG. 2 begins in step 200. In step 202, the phase encoder 122 receives the user data from the user data system 110, and the modulator 126 receives the first optical signal from the optical signal source 130. In step 204, the phase encoder 122 phase encodes the user data to form an encoded signal representing the user data. In step 206, the phase shifter 124 shifts a phase of the encoded signal to generate a phase shifted signal. In step 208, the modulator 126 modulates the first optical signal with the encoded signal and the phase shifted signal to form an optical single sideband signal representing the user data. In one embodiment, the modulator 126 receives the encoded signal and the phase shifted signal via the links 127 and 128 respectively. The modulator 126 then transmits the optical single sideband signal representing the user data via the optic fiber 140 in step 210. FIG. 2 ends in step 212.

Figure 3A:
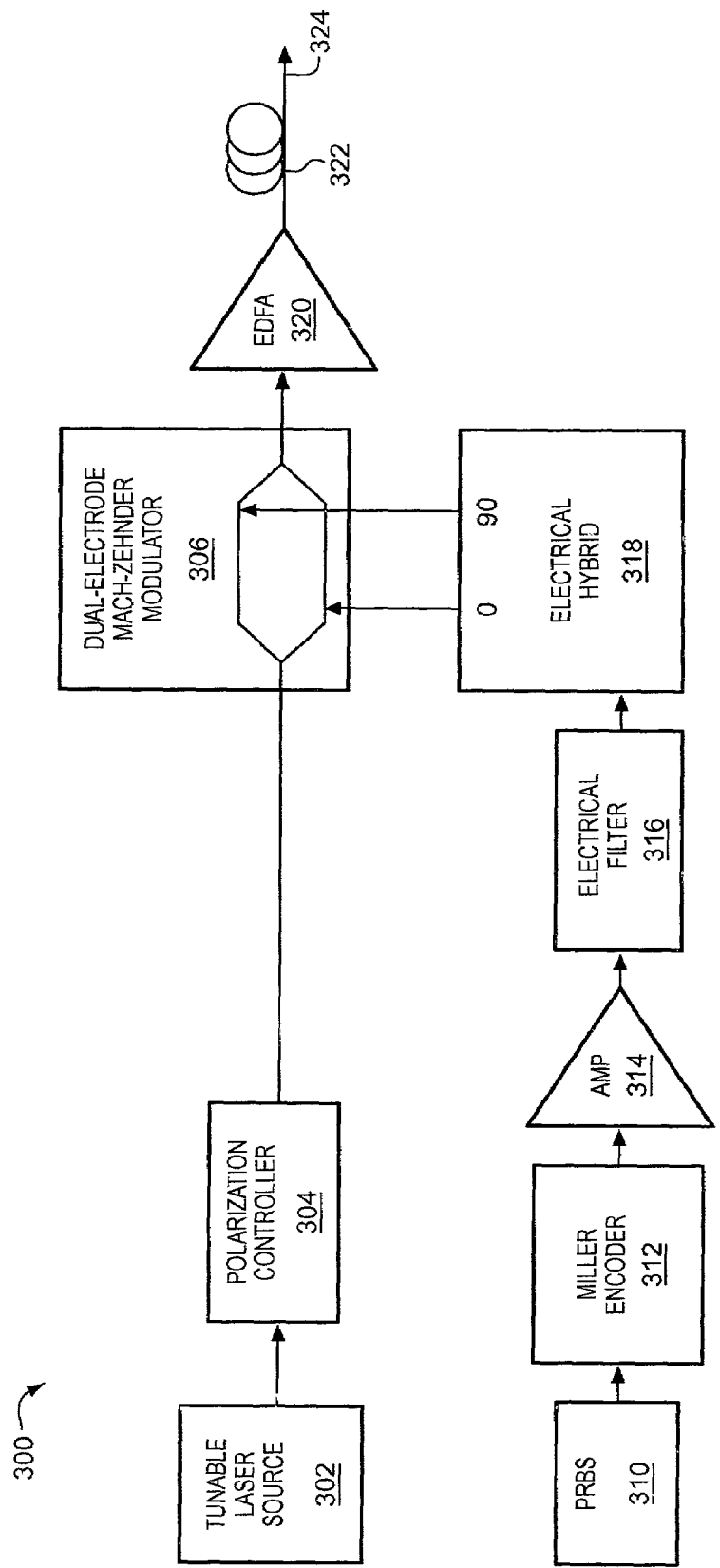
FIGS. 3A and 3B are illustrations of a communication system in an example of the invention.
Figure 3B:
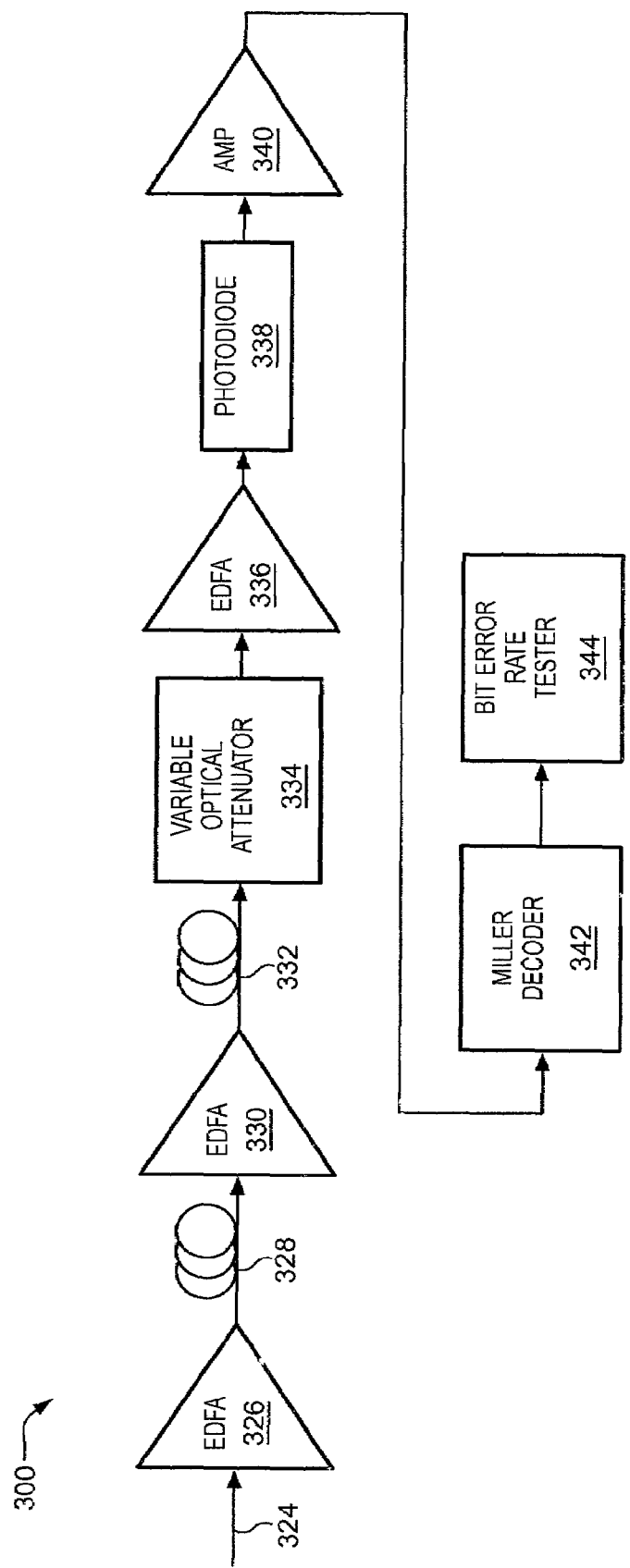

Communication System without Carrier Suppression—FIGS. 3A–3B

FIG. 3A depicts an illustration of a communication system 300 in an example of the invention. The communication system 300 includes a tunable laser source 302, a polarization controller 304, a Dual-Electrode Mach-Zehnder modulator 306, a pseudo random bit sequence (PRBS) generator 310, a Miller encoder 312, an amplifier 314, an electrical filter 316, an electrical hybrid 318, an Erbium doped fiber amplifier (EDFA) 320, a Standard Single-Mode Fiber (SSMF) optic fiber 322, and a link 324.

The tunable laser source 302 is connected to the polarization controller 304. The polarization controller 304 is connected to the Dual-Electrode Mach-Zehnder modulator 306. The PRBS generator 310 is connected to the Miller encoder 312. The Miller encoder 312 is connected to the amplifier 314. The amplifier 314 is connected to the electrical hybrid 318. The 0 degree and 90 degree outputs of the electrical hybrid are connected to separate electrodes of the Dual-Electrode Mach-Zehnder modulator 306. The Dual-Electrode Mach-Zehnder modulator 306 is connected to the SSMF optic fiber 322. The SSMF optic fiber 322 is connected to the link 324.

The tunable laser source 302 is a conventional laser source that can be tuned to a specific frequency (or wavelength). The polarization controller 304 is a conventional device configured to control the polarization of optical signals. The Dual-Electrode Mach-Zehnder modulator 306 is a conventional device configured to modulate optical signals based on two electrical signals. For this embodiment, the bias voltage difference on the two electrode of the Dual-Electrode Mach-Zehnder modulator 306 is $V_\pi/2$, which is 4.2 V.

The PRBS generator 310 is a conventional device configured to generate a pseudo random bit sequence. The Miller encoder 312 is a conventional device configured to encode the user data with Miller coding to form an encoded signal representing the user data. The amplifier 314 is a conventional electrical amplifier. The electrical filter 316 is a conventional filter configured to filter electrical signals. The electrical hybrid 318 is a device configured to shift the phase of the electrical signal 90 degrees. The electrical hybrid 318 has two outputs for a non-shifted signal and a 90 degree shifted signal. In this embodiment, the electrical hybrid 318 has a 1 dB bandwidth that extends from 1 GHz to 18 GHz. In this embodiment, the SSMF optic fiber 322 is 85 km.

In operation, the tunable laser source 302 is tuned to a specific frequency or wavelength. The tunable laser source 302 transmits a continuous wave optical signal with the specific frequency or wavelength. The polarization controller 304 adjusts the polarization of the continuous wave optical signal. The PRBS generator 310 generates and transmits an electrical signal with a pseudo random bit sequence. The pseudo random bit sequence is used to simulate user data. The Miller encoder 312 encodes the electrical signal with the pseudo random bit sequence using Miller coding. The amplifier 314 then amplifies the electrical signal. The electrical filter 316 then filters the electrical signal. This electrical filter 316 prevents the leading edge of the signal eye from being severely distorted. The electrical filter 316 shapes the signal waveform such that the leading edge has to overshoot to compensate for distortion. In this embodiment, the electrical filter 316 could be a Butterworth or Bessel low-pass filter of between third and twelfth order. The electrical hybrid 318 then shifts the phase of the electrical signal by 90 degrees. The electrical hybrid 318 then transmits the non-shifted electrical signal from the output for 0 degrees. The electrical hybrid also transmits the shifted electrical signal from the output for 90 degrees. As the driving voltage of the electrical hybrid 318 increases, advantageously the receiver sensitivity becomes better. However, if the driving voltage is too large, the receiver sensitivity degrades due to the modulation nature of the Dual-Electrode Mach-Zehnder modulator 306.

The Dual-Electrode Mach-Zehnder modulator 306 then modulates the continuous wave optical signal based on the non-shifted electrical signal and the shifted optical signal to form an optical single sideband signal. This optical single sideband signal is Miller encoded and carries the pseudo random bit sequence. In this embodiment, the modulated electrical field right after the Dual-Electrode Mach-Zehnder modulator 306 is modeled as:

$$E(t) = \frac{E_{in}}{2}\exp\left(j\pi\frac{x}{V_\pi} - j\pi\frac{V_\pi/4}{V_\pi}\right) + \frac{E_{in}}{2}\exp\left(j\pi\frac{\hat{x}}{V_\pi} + j\pi\frac{V_\pi/4}{V_\pi}\right)$$

where x is the signal and $\hat{x}$ is the Hilbert transform generated by the broadband electrical hybrid. The EDFA 320 then amplifies the optical single sideband signal and transmits the optical single sideband signal via the SSMF optic fiber 322 and the link 324.

FIG. 3B depicts an illustration of a communication system 300 in an example of the invention. The communication system 300 comprises the link 324, an EDFA 326, an SSMF optic fiber 328, an EDFA 330, an SSMF optic fiber 332, a variable optical attenuator 334, an EDFA 336, a photodiode 338, an amplifier 340, a Miller decoder 342, and a bit error rate tester 344. The link 324 is connected to the EDFA 326. The EDFA 326 is connected to the SSMF optic fiber 328. The SSMF optic fiber 328 is connected to the EDFA 330. The EDFA 330 is connected to the SSMF optic fiber 332. The SSMF optic fiber 332 is connected to the variable optical attenuator 334. The variable optical attenuator 334 is connected to the EDFA 336. The EDFA 336 is connected to the photodiode 338. The photodiode 338 is connected to the amplifier 340. The amplifier 340 is connected to the Miller decoder 342. The Miller decoder 342 is connected to the bit error rate tester 344.

In this embodiment, the SSMF optic fiber 328 is 100 km, and the SSMF optic fiber 332 is 100 km. The variable optical attenuator 334 is a conventional device configured to attenuate optical signals. The photodiode 338 is a conventional device configured to convert optical signals into electrical signals. The Miller decoder 342 is a conventional device configured to decode the user data with Miller decoding from an encoded signal representing the user data. The bit error rate tester 344 is a conventional device configured to test the bit error rate of a signal.

In operation, the EDFA 326 receives the optical single sideband signal from the link 324. The EDFA 326 then amplifies the optical single sideband signal. The EDFA 330 then receives the optical single sideband signal from the SSMF optic fiber 328. The EDFA 330 then amplifies the optical single sideband signal. The variable optical attenuator 334 receives the optical single sideband signal from the SSMF optic fiber 332 and attenuates the optical single sideband signal. The EDFA 336 then amplifies the optical single sideband signal. The photodiode 338 converts the optical single sideband signal into an electrical signal that is encoded with Miller coding and carries the pseudo random bit sequence. After square law detection of the photodiode 338, the detected signal is represented as follows:

$$D(t)=2+2\sin(x-\hat{x})$$

Therefore, for a direct detection process, the Hilbert transform term presents as an interference term. For the ideal case the Hilbert transform, $\hat{x}$, is treated as narrow pulses that only affect the transition edge of the signal, leaving the majority of the signal eye untouched. However, the bandwidth limitation of the electrical hybrid 318 results in $\hat{x}$ not having sharp transition and possible eye closure. This phenomena sets the upper data rate limit for this configuration in this embodiment to be 5 Gbps. The amplifier 340 then amplifies the electrical signal. The Miller decoder 342 decodes the electrical signal with Miller decoding. The bit error rate tester 344 then tests the electrical signal for the bit error rate.

One advantage of this communication system 300 is the superior sideband suppression ratio using Miller coding. Another advantage is spectral efficiency of greater than 1 bps/Hz can be achieved by the communication system 300 because of the narrow transmission bandwidth. Another advantage of the communication system 300 is no additional active analog circuitry is required except for the Dual-Electrode Mach-Zehnder modulator 306.

Figure 4:
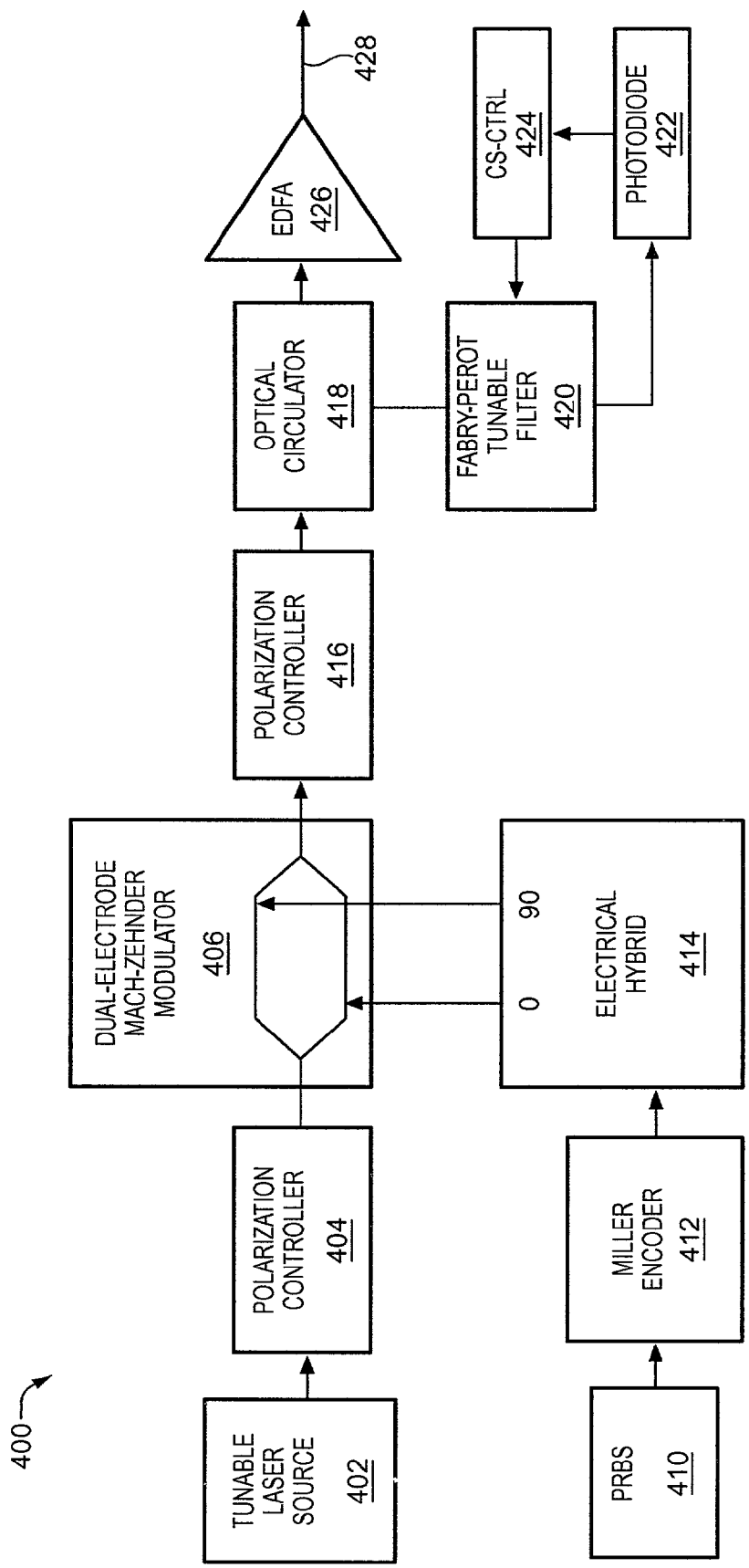
FIG. 4 is an illustration of a communication system with carrier suppression in an example of the invention.

Communication System with Carrier Suppression—FIG. 4

FIG. 4 depicts an illustration of a communication system 400 with carrier suppression in an example of the invention. The communication system 400 comprises a tunable laser source 402, the polarization controller 404, a Dual-Electrode Mach-Zehnder modulator 406, a PRBS generator 410, a Miller encoder 412, an electrical hybrid 414, a polarization controller 416, an optical circulator 418, a Fabry-Perot tunable filter 420, a photodiode 422, a CS-controller 424, an EDFA 426, and a link 428.

The tunable laser source 402 is connected to the polarization controller 404. The polarization controller 404 is connected to the Dual-Electrode Mach-Zehnder modulator 406. The PRBS generator 410 is connected to the Miller encoder 412. The Miller encoder 412 is connected to the electrical hybrid 414. The 0 degree and 90 degree outputs of the electrical hybrid 414 are connected to separate electrodes of the Dual-Electrode Mach-Zehnder modulator 406. The Dual-Electrode Mach-Zehnder modulator 406 is connected to the polarization controller 416. The polarization controller 416 is connected to the optical circulator 418. The optical circulator 418 is connected to the EDFA 426 and the Fabry-Perot tunable filter 420. The Fabry-Perot tunable filter 420 is connected to the photodiode 422. The photodiode 422 is connected to the CS-controller 424. The CS-controller 424 is connected to the Fabry-Perot tunable filter 420. The EDFA 426 is connected to the link 428.

The optical circulator 418 is a conventional optical circulator configured to transfer optical signals. The Fabry-Perot tunable filter 420 is a conventional filter configured to filter optical signals. In this embodiment, the Fabry-Perot tunable filter 420 is narrowband and operates in reflection mode to suppress the carrier. In this embodiment, the Fabry-Perot tunable filter 420 has a 3 dB bandwidth of 50 MHz. The photodiode 422 is a conventional device configured to convert optical signals into electrical signals. The CS-controller 424 is a device configured to provide control instructions to the Fabry-Perot tunable filter 420.

In operation, the tunable laser source 402 is tuned to a specific frequency or wavelength. The tunable laser source 402 transmits a continuous wave optical signal with the specific frequency or wavelength. The polarization controller 404 adjusts the polarization of the continuous wave optical signal. The PRBS generator 410 generates and transmits an electrical signal with a pseudo random bit sequence. The pseudo random bit sequence is used to simulate user data. The Miller encoder 412 encodes the electrical signal with the pseudo random bit sequence using Miller coding or delay modulation. The electrical hybrid 414 then shifts the phase of the electrical signal by 90 degrees. The electrical hybrid 414 then transmits the non-shifted electrical signal from the output for 0 degrees. The electrical hybrid also transmits the shifted electrical signal from the output for 90 degrees. The Dual-Electrode Mach-Zehnder modulator 406 then modulates the continuous wave optical signal based on the non-shifted electrical signal and the shifted optical signal to form an optical single sideband signal. This optical single sideband signal is Miller coded and carries the pseudo random bit sequence. The polarization controller 416 adjusts the polarization of the optical single sideband signal.

The optical circulator 418 then transfers the optical single sideband signal to the Fabry-Perot tunable filter 420. The Fabry-Perot tunable filter 420 then filters the optical single sideband signal based on control instructions from the CS-controller 424. Miller coding shapes the signal spectrum such that there is negligible low-frequency component near the optical carrier. Thus, suppressing the optical carrier with an optical filter such as the Fabry-Perot tunable filter 420 is straightforward. The Fabry-Perot tunable filter 420 suppresses the optical carrier of the optical single sideband signal and reflects and transmits the signal spectrum components of the optical single sideband signal without the optical carrier. The Fabry-Perot tunable filter 420 is polarization sensitive due to its long cavity. Therefore, the polarization controller 416 is used to achieve maximal performance. Two major parameters of the Fabry-Perot tunable filter are the filter bandwidth and the cavity loss. The wider the bandwidth is, the more suppression of the carrier can be achieved.

The photodiode 422 converts the optical single sideband signal to an electrical signal. The CS-controller 424 processes the electrical signal to set the correct voltage on the Fabry-Perot tunable filter 420. The CS-controller 424 detects the power that passes through the Fabry-Perot tunable filter 420 and locks to the maximal power. Since the drift of the notch frequency is very slow, detecting DC power is sufficient to achieve good performance. The CS-controller 424 then generates and transmits the control instructions to the Fabry-Perot tunable filter 420 to set the correct voltage.

The optical circulator 418 then transfers the reflected optical single sideband signal with the suppressed carrier to the optical circulator. The EDFA 426 amplifies and transmits the reflected optical single sideband signal with the suppressed carrier via the link 428. The reflected optical single sideband signal with the suppressed carrier is then transmitted along an optic fiber, decoded, and bit error rate tested as described above in FIG. 3B.

Figure 5:
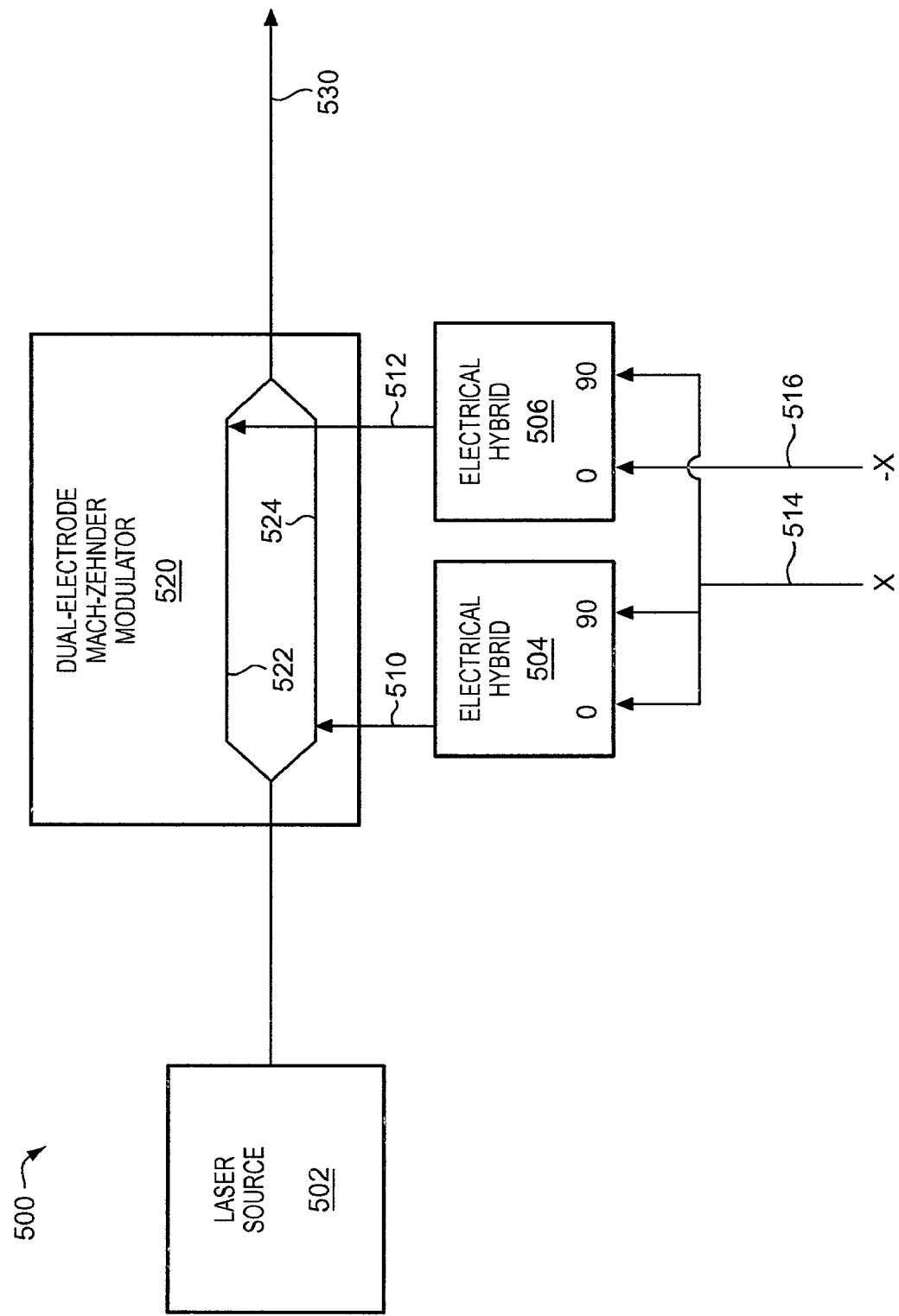
FIG. 5 is an illustration of a communication system with two electrical hybrids in an example of the invention.

Communication System with Two Electrical Hybrids—FIG. 5

FIG. 5 depicts an illustration of a communication system 500 with two electrical hybrids in an example of the invention. The communication system 500 comprises a laser source 502, a Dual-Electrode Mach-Zehnder Modulator 520, an electrical hybrid 504, an electrical hybrid 506, link 510, link 512, link 514, link 516, and link 530. The Dual-Electrode Mach-Zehnder Modulator 520 includes a first path 522 and a second path 524. FIG. 5 depicts an alternative embodiment for the configuration of the Dual-Electrode Mach-Zehnder modulator 520 and two electrical hybrids 504 and 506 that increases the data rate as compared with the configuration in FIG. 3A. The laser source 502 is connected to the Dual-Electrode Mach-Zehnder Modulator 520. The Dual-Electrode Mach-Zehnder Modulator 520 is connected to the link 530. The link 514 is connected to two inputs of the electrical hybrid 504 and one input of the electrical hybrid 506. The link 516 is connected to one input of the electrical hybrid 506. The link 510 is connected to the output of the electrical hybrid 504 and the second path 524 of the Dual-Electrode Mach-Zehnder Modulator 520. The link 512 is connected to the output of the electrical hybrid 506 and the first path 522 of the Dual-Electrode Mach-Zehnder Modulator 520.

In operation, the laser source 502 generates and transmits a continuous wave optical signal to the Dual-Electrode Mach-Zehnder Modulator 520. The link 514 carries the data signal x to the inputs of the electrical hybrid 504 and the electrical hybrid 506. The link 516 carries the complement of the data signal x, which is shown as −x, to the input of the electrical hybrid 506. The electrical hybrid 504 then processes the signal at the two input and generates a first electrical signal, which is x+x_cap, where x_cap is the Hilbert transform of signal x. The electrical hybrid 506 then processes the signal at the two input and generates a second electrical signal, which is −x+x_cap. In this embodiment, the electrical hybrid 504 and the electrical hybrid 506 operate between 1 and 18 GHz.

The Dual-Electrode Mach-Zehnder Modulator 520 then modulates the continuous wave optical signal along the first path 522 based on the second electrical signal of −x+x_cap. The Dual-Electrode Mach-Zehnder Modulator 520 also modulates the continuous wave optical signal along the second path 524 based on the first electrical signal of x+x_cap. The resulting signal is an optical single sideband signal. The Dual-Electrode Mach-Zehnder Modulator 520 then transmits the optical single sideband signal along the link 530. After the signal is detected by the photodiode, the signal is represented by 2+sin(x), where x_cap generates no interference at all. One advantage of this embodiment is the communication system 500 runs at 10 Gbps as compared to the communication system 300 in FIGS. 3A and 3B, which runs at 5 Gbps.

Figure 6:
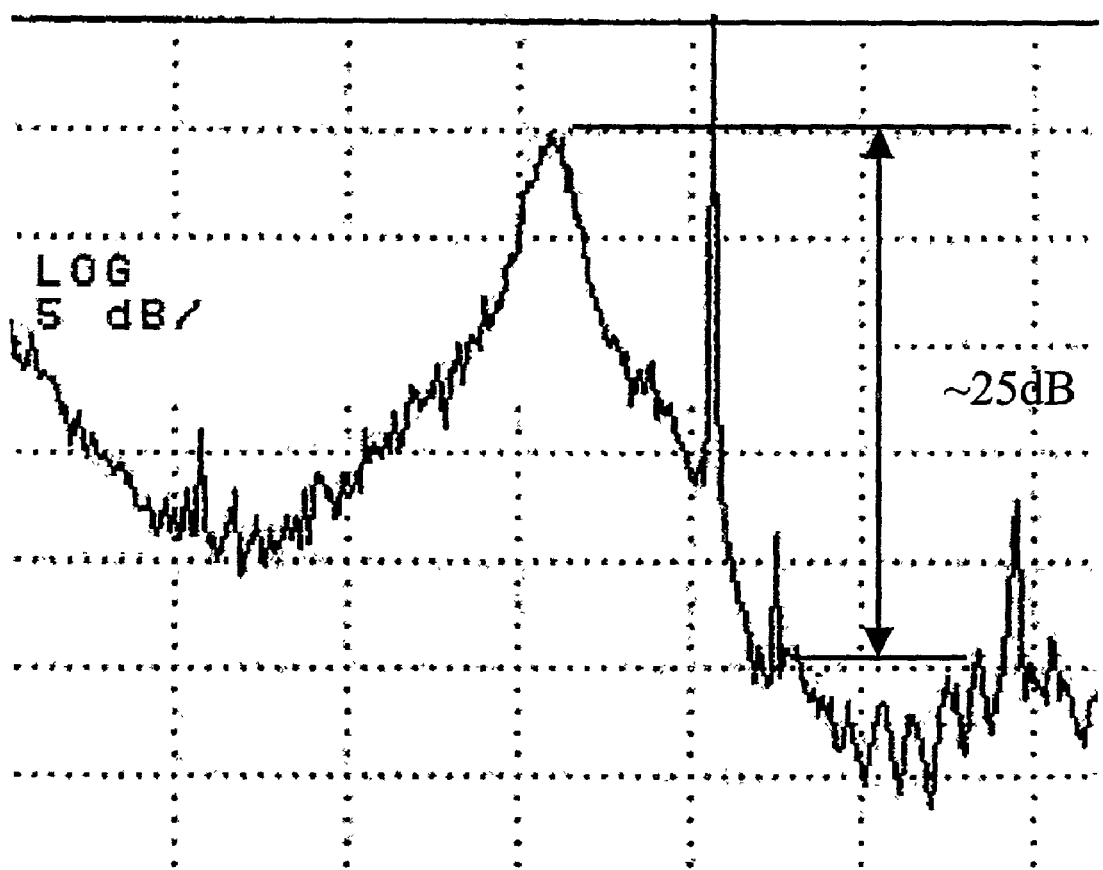
FIG. 6 is a graph of a power spectrum density of an optical single sideband signal with Miller coding in an example of the invention.
Figure 7A:
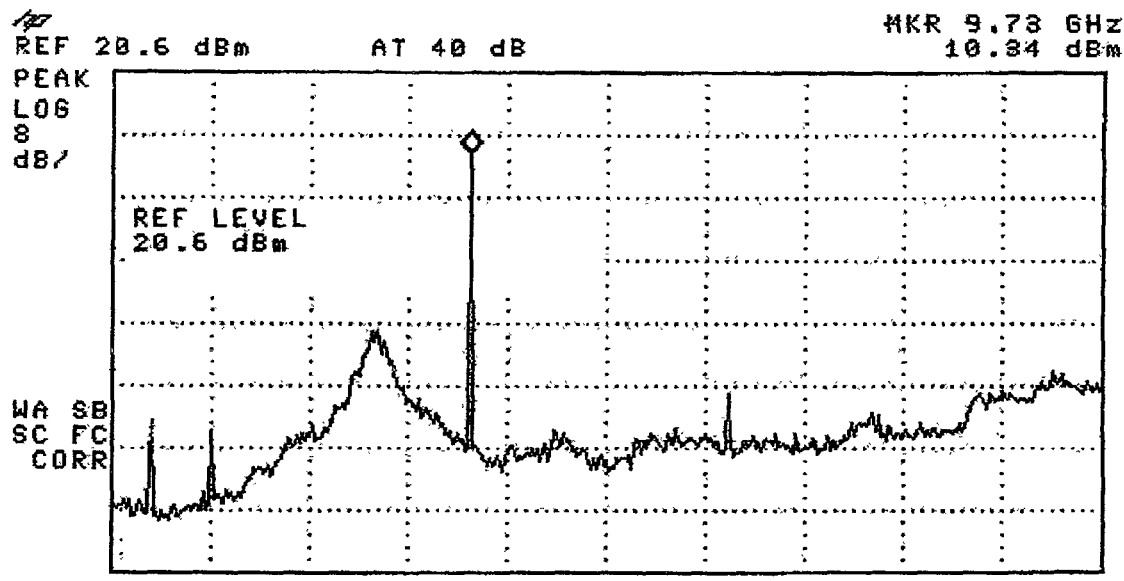
FIG. 7A is a graph of power spectrum density of an optical single sideband signal without carrier suppression in an example of the invention.
Figure 7B:
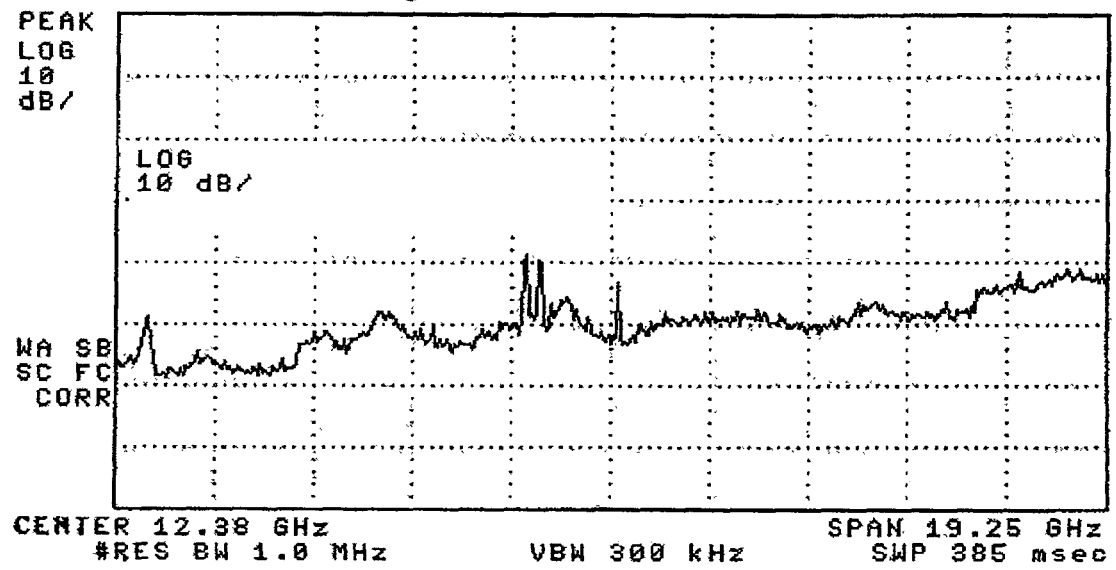
FIG. 7B is a graph showing no optical power passes through a Fabry-Perot tunable filter in an example of the invention.
Figure 7C:
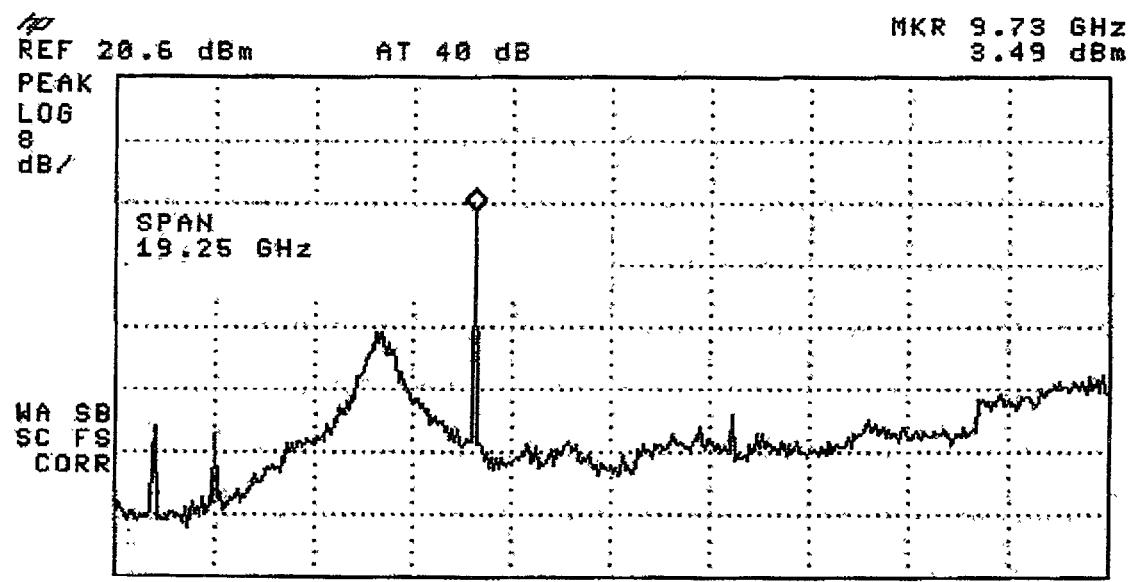
FIG. 7C is a graph of power spectrum density of an optical single sideband signal with carrier suppression in an example of the invention.
Figure 7D:
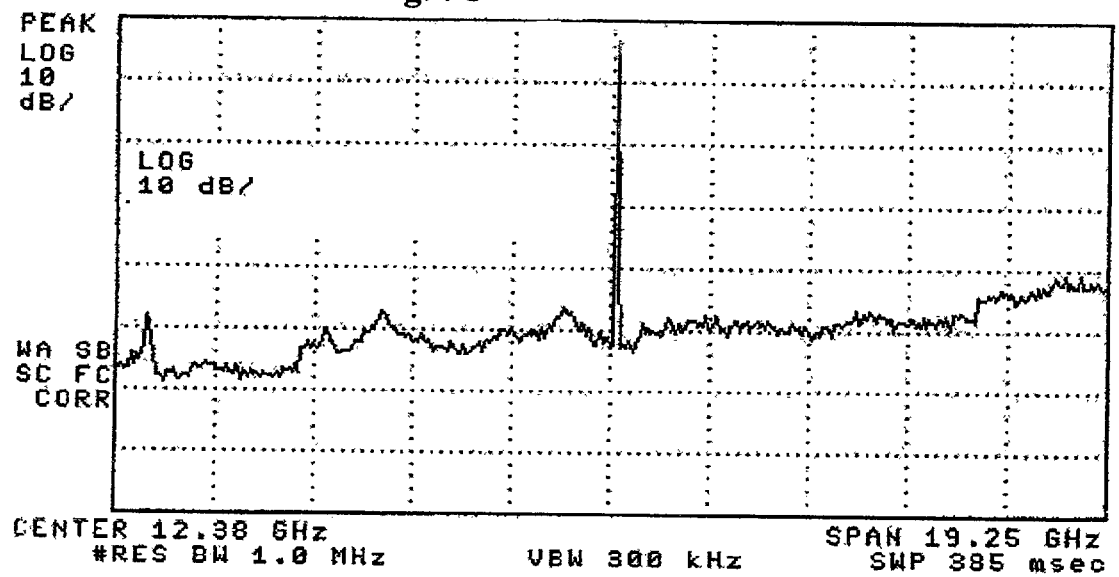
FIG. 7D is a graph showing the corresponding carrier that passes through a Fabry-Perot tunable filter in an example of the invention.

Graphs—FIGS. 6–7D

FIG. 6 depicts a graph of a power spectrum density of an optical single sideband signal with Miller coding in an example of the invention. The optical single sideband signal with Miller coding has a power spectrum density sideband suppression of about 25 dB. For a Non-Return to Zero signal, the power spectrum density sideband suppression is more than 20 dB. Advantageously, Miller coding or delay modulation has better sideband suppression over the NRZ signal because Miller coding has negligible low frequency components below 1 GHZ, where the conversion efficiency of the hybrid is poor.

FIG. 7A depicts a graph of power spectrum density of an optical single sideband signal without carrier suppression in an example of the invention. FIG. 7A shows the experiment result of signal spectrum without carrier suppression. FIG. 7B depicts a graph showing no optical power passes through the Fabry-Perot tunable filter 420 in an example of the invention. FIG. 7B shows no optical power passes through the Fabry-Perot tunable filter 420 since the carrier is not suppressed as in FIG. 7A. FIG. 7C depicts a graph of power spectrum density of an optical single sideband signal with carrier suppression in an example of the invention. FIG. 7C shows the signal spectrum of an optical single sideband signal with carrier suppression. FIG. 7D depicts a graph showing the corresponding carrier that passes through the Fabry-Perot tunable filter 420 in an example of the invention. Generally, the wider the bandwidth is, the more carrier power can be suppressed. However, the main purpose of carrier suppression is to minimize total transmission power to combat system nonlinearities. Suppressing the carrier more than 10 dB does not provide an effective decrease of unwanted transmission power.

The invention claimed is:

1. A communication method comprising:
   receiving user data and a first optical signal;
   phase encoding the user data to form an encoded signal representing the user data;
   shifting a phase of the encoded signal to generate a phase shifted signal;
   modulating the first optical signal with the encoded signal and the phase shifted signal to form an optical single sideband signal representing the user data; and
   transmitting the optical single sideband signal representing the user data.

2. The communication method of claim 1 wherein phase encoding the user data comprises Miller encoding.

3. The communication method of claim 1 wherein phase encoding the user data comprises Manchester encoding.

4. The communication method of claim 1 wherein shifting the phase of the encoded signal is by ninety degrees.

5. The communication method of claim 1 wherein shifting the phase of the encoded signal is by an electrical hybrid.

6. The communication method of claim 1 further comprising suppressing a carrier of the optical single sideband signal.

7. The communication method of claim 6 wherein suppressing the carrier of the optical single sideband signal is by a Fabry-Perot filter.

8. The communication method of claim 1 wherein modulating the first optical signal with the encoded signal and the phase shifted signal is by a Dual-Electrode Mach-Zehnder modulator.

9. The communication method of claim 1 further comprising filtering the encoded signal.

10. The communication method of claim 9 wherein filtering the encoded signal is by a Butterworth low pass filter.

11. The communication method of claim 9 wherein filtering the encoded signal is by a Bessel low pass filter.

12. The communication method of claim 1 wherein modulating the first optical signal with the encoded signal and the phase shifted signal to form an optical single sideband signal representing the user data comprises suppressing one of the sidebands of the optical single sideband signal.

13. The communication method of claim 1 further comprising converting the optical single sideband signal into a second electrical signal representing the user data.

14. The communication method of claim 13 further comprising phase decoding the second electrical signal to retrieve the user data.

15. The communication method of claim 1 further comprising generating the first optical signal.

16. A communication system comprising:
    a phase encoder configured to receive user data and phase encode the user data to form an encoded signal representing the user data;
    a phase shifter configured to shift a phase of the encoded signal to generate a phase shifted signal; and
    a modulator configured to receive a first optical signal, modulate the first optical signal with the encoded signal and the phase shifted signal to form an optical single sideband signal representing the user data, and transmit the optical single sideband signal representing the user data.

17. The communication system of claim 16 wherein the phase encoder is configured to Miller encode the user data to form the encoded signal representing the user data.

18. The communication system of claim 16 wherein the phase encoder is configured to Manchester encode the user data to form the encoded signal representing the user data.

19. The communication system of claim 16 wherein the phase shifter is configured to shift the phase of the encoded signal by ninety degrees.

20. The communication system of claim 16 wherein the phase shifter comprises an electrical hybrid configured to shift the phase of the encoded signal.

21. The communication system of claim 16 further comprising an optical filter configured to suppress a carrier of the optical single sideband signal.

22. The communication system of claim 21 wherein the optical filter comprises a Fabry-Perot filter.

23. The communication system of claim 16 wherein the modulator comprises a Dual-Electrode Mach-Zehnder modulator configured to modulate the first optical signal with the encoded signal and the phase shifted signal.

24. The communication system of claim 16 further comprising an electrical filter configured to filter the encoded signal.

25. The communication system of claim 24 wherein the electrical filter comprises a Butterworth low pass filter.

26. The communication system of claim 24 wherein the electrical filter comprises a Bessel low pass filter.

27. The communication system of claim 16 wherein the modulator is configured to suppress one of the sidebands of the optical single sideband signal.

28. The communication system of claim 16 further comprising a photodiode configured to convert the optical single sideband signal into a second electrical signal representing the user data.

29. The communication system of claim 28 further comprising a phase decoder configured to phase decode the second electrical signal to retrieve the user data.

30. The communication system of claim 16 further comprising an optical source configured to generate the first optical signal.

* * * * *

UNITED STATES PATENT AND TRADEMARK OFFICE
CERTIFICATE OF CORRECTION

PATENT NO. : 7,133,621 B1  Page 1 of 1
APPLICATION NO. : 10/194795
DATED : November 7, 2006
INVENTOR(S) : Fu-Tai An It is certified that error appears in the above-identified patent and that said Letters Patent is hereby corrected as shown below:

TITLE PAGE, ITEM (57) ASSIGNEE:
Add the following Assignee to page 1:

-- The Board of Trustees of the Leland Stanford Junior University, Palo Alto, CA (US) --

Signed and Sealed this

Twenty-third Day of October, 2007

JON W. DUDAS
*Director of the United States Patent and Trademark Office*